United States Patent
Hahn et al.

(10) Patent No.: US 8,788,849 B2
(45) Date of Patent: Jul. 22, 2014

(54) METHOD AND APPARATUS FOR PROTECTING CACHED STREAMS

(75) Inventors: Judah Gamliel Hahn, Ofra (IL); Avraham Shmuel, Sde Warburg (IL)

(73) Assignee: SanDisk Technologies Inc., Plano, TX (US)

( * ) Notice: Subject to any disclaimer, the term of this patent is extended or adjusted under 35 U.S.C. 154(b) by 146 days.

(21) Appl. No.: 13/331,266

(22) Filed: Dec. 20, 2011

(65) Prior Publication Data

US 2012/0221865 A1 Aug. 30, 2012

Related U.S. Application Data

(60) Provisional application No. 61/447,594, filed on Feb. 28, 2011.

(51) Int. Cl.
G06F 11/30 (2006.01)

(52) U.S. Cl.
USPC .......................................................... 713/193

(58) Field of Classification Search
USPC .......................................................... 713/193
See application file for complete search history.

(56) References Cited

U.S. PATENT DOCUMENTS

| | | | |
|---|---|---|---|
| 5,491,810 A | 2/1996 | Allen | |
| 5,724,578 A | 3/1998 | Morinaga et al. | |
| 5,754,939 A | 5/1998 | Herz et al. | |
| 5,790,886 A | 8/1998 | Allen | |
| 5,835,935 A | 11/1998 | Estakhri et al. | |
| 5,838,614 A | 11/1998 | Estakhri et al. | |
| 5,893,920 A | 4/1999 | Shaheen et al. | |
| 6,134,584 A | 10/2000 | Chang et al. | |
| 6,138,158 A | 10/2000 | Boyle et al. | |
| 6,185,625 B1 | 2/2001 | Tso et al. | |
| 6,217,752 B1 | 4/2001 | Coots | |
| 6,366,912 B1 | 4/2002 | Wallent et al. | |
| 6,393,465 B2 | 5/2002 | Leeds | |
| 6,453,383 B1 | 9/2002 | Stoddard et al. | |
| 6,542,964 B1 | 4/2003 | Scharber | |
| 6,542,967 B1 | 4/2003 | Major | |

(Continued)

FOREIGN PATENT DOCUMENTS

| | | |
|---|---|---|
| CN | 101375579 | 9/2009 |
| EP | 0866590 | 8/1998 |

(Continued)

OTHER PUBLICATIONS

Cheng et al., "StreamTo: Streaming Content Using a Tamper-Resistant Token", retrieved from: http://doc.utwente.nl/56985/1/00000011c.pdf, Dec. 12, 2005, pp. 1-18.

(Continued)

*Primary Examiner* — Andrew Georgandellis
(74) *Attorney, Agent, or Firm* — Brinks Gilson & Lione

(57) ABSTRACT

A system and method for protecting cached streamed data is disclosed. The method may include the steps of generating an encryption key from the streamed data itself, encrypting the streamed data stored in the storage device and requesting the portion of the streamed data from the content server again when later playback is desired so as to allow the content server to enforce access limitations or takedown policies relating to the streamed data. The method may also include procedures for handling key generation over reliable or unreliable protocols.

25 Claims, 9 Drawing Sheets

(56) References Cited

U.S. PATENT DOCUMENTS

| | | | |
|---|---|---|---|
| 6,553,393 | B1 | 4/2003 | Eilbott et al. |
| 6,598,121 | B2 | 7/2003 | Challenger et al. |
| 6,742,033 | B1 | 5/2004 | Smith et al. |
| 6,799,251 | B1 | 9/2004 | Jacobs et al. |
| 6,826,599 | B1 | 11/2004 | Shaffer et al. |
| 6,917,960 | B1 | 7/2005 | Decasper et al. |
| 6,937,813 | B1 | 8/2005 | Wilson |
| 6,996,676 | B2 | 2/2006 | Megiddo et al. |
| 7,043,506 | B1 | 5/2006 | Horvitz |
| 7,043,524 | B2 | 5/2006 | Shah et al. |
| 7,103,598 | B1 | 9/2006 | Clement |
| 7,136,885 | B2 | 11/2006 | Wright et al. |
| 7,155,519 | B2 | 12/2006 | Lo et al. |
| 7,167,840 | B1 | 1/2007 | Seidman et al. |
| 7,246,139 | B2 | 7/2007 | Andoh |
| 7,246,268 | B2 | 7/2007 | Craig et al. |
| 7,248,861 | B2 | 7/2007 | Lazaridis et al. |
| 7,269,851 | B2 | 9/2007 | Ackroyd |
| 7,289,563 | B2 | 10/2007 | Yamamoto |
| 7,305,473 | B2 | 12/2007 | Vogt |
| 7,317,907 | B2 | 1/2008 | Linkert et al. |
| 7,356,591 | B2 | 4/2008 | Mousseau et al. |
| 7,395,048 | B2 | 7/2008 | Kotzin |
| 7,428,540 | B1 | 9/2008 | Coates et al. |
| 7,430,633 | B2 | 9/2008 | Church et al. |
| 7,472,247 | B2 | 12/2008 | Vitanov et al. |
| 7,483,871 | B2 | 1/2009 | Herz |
| 7,512,666 | B2 | 3/2009 | Zhou |
| 7,512,847 | B2 | 3/2009 | Bychkov et al. |
| 7,523,013 | B2 | 4/2009 | Gorobets et al. |
| 7,525,570 | B2 | 4/2009 | Kiely |
| 7,549,164 | B2 | 6/2009 | Cook et al. |
| 7,568,075 | B2 | 7/2009 | Fujibayashi et al. |
| 7,574,580 | B2 | 8/2009 | Mahashin et al. |
| 7,650,630 | B2 | 1/2010 | Yamada et al. |
| 7,689,805 | B2 | 3/2010 | Moore et al. |
| 7,748,031 | B2 | 6/2010 | Gonzalez et al. |
| 7,783,956 | B2 | 8/2010 | Ko et al. |
| 7,975,305 | B2 | 7/2011 | Rubin et al. |
| 8,000,474 | B1 * | 8/2011 | Evans et al. .................. 380/205 |
| 8,001,217 | B1 | 8/2011 | Pan et al. |
| 8,037,527 | B2 | 10/2011 | Milener et al. |
| 2001/0000083 | A1 | 3/2001 | Crow et al. |
| 2002/0165825 | A1 | 11/2002 | Matsushima et al. |
| 2002/0194382 | A1 | 12/2002 | Kausik et al. |
| 2003/0009538 | A1 | 1/2003 | Shah et al. |
| 2003/0023745 | A1 | 1/2003 | Noe |
| 2003/0023845 | A1 * | 1/2003 | VanHeyningen ............. 713/151 |
| 2003/0033308 | A1 | 2/2003 | Patel et al. |
| 2003/0114138 | A1 | 6/2003 | Ramaswamy et al. |
| 2003/0115420 | A1 | 6/2003 | Tsirigotis et al. |
| 2003/0166399 | A1 | 9/2003 | Tokkonen et al. |
| 2003/0172236 | A1 | 9/2003 | Iyengar et al. |
| 2003/0187960 | A1 | 10/2003 | Koba et al. |
| 2003/0189589 | A1 | 10/2003 | LeBlanc et al. |
| 2003/0236961 | A1 | 12/2003 | Qiu et al. |
| 2004/0049579 | A1 | 3/2004 | Ims et al. |
| 2004/0117586 | A1 | 6/2004 | Estakhri et al. |
| 2004/0122873 | A1 | 6/2004 | Wright |
| 2004/0127235 | A1 | 7/2004 | Kotzin |
| 2004/0221018 | A1 | 11/2004 | Ji |
| 2004/0221118 | A1 | 11/2004 | Slater et al. |
| 2004/0221130 | A1 | 11/2004 | Lai et al. |
| 2004/0260880 | A1 | 12/2004 | Shannon et al. |
| 2005/0039177 | A1 | 2/2005 | Burke |
| 2005/0076063 | A1 | 4/2005 | Andoh |
| 2005/0097278 | A1 | 5/2005 | Hsu et al. |
| 2005/0102291 | A1 | 5/2005 | Czuchry et al. |
| 2005/0132286 | A1 | 6/2005 | Rohrbaugh et al. |
| 2005/0165644 | A1 | 7/2005 | Beyda et al. |
| 2005/0246543 | A1 | 11/2005 | Ezaki et al. |
| 2005/0273514 | A1 | 12/2005 | Milkey et al. |
| 2006/0008256 | A1 | 1/2006 | Khedouri et al. |
| 2006/0010154 | A1 | 1/2006 | Prahlad et al. |
| 2006/0020745 | A1 | 1/2006 | Conley et al. |
| 2006/0021032 | A1 | 1/2006 | Challener et al. |
| 2006/0059326 | A1 | 3/2006 | Aasheim et al. |
| 2006/0064555 | A1 | 3/2006 | Prahlad et al. |
| 2006/0075068 | A1 | 4/2006 | Kasriel et al. |
| 2006/0075424 | A1 | 4/2006 | Talstra et al. |
| 2006/0080664 | A1 | 4/2006 | Jawahar et al. |
| 2006/0107062 | A1 | 5/2006 | Fauthoux |
| 2006/0129496 | A1 | 6/2006 | Chow et al. |
| 2006/0136446 | A1 | 6/2006 | Hughes et al. |
| 2006/0161604 | A1 | 7/2006 | Lobo |
| 2006/0161960 | A1 | 7/2006 | Benoit |
| 2006/0168123 | A1 | 7/2006 | Krstulich |
| 2006/0168129 | A1 | 7/2006 | Van Geest et al. |
| 2006/0168403 | A1 | 7/2006 | Kolovson |
| 2006/0200503 | A1 | 9/2006 | Dosa et al. |
| 2006/0218304 | A1 | 9/2006 | Mukherjee et al. |
| 2006/0218347 | A1 | 9/2006 | Oshima |
| 2006/0256012 | A1 | 11/2006 | Fok et al. |
| 2006/0259715 | A1 | 11/2006 | Getzin et al. |
| 2006/0282886 | A1 | 12/2006 | Gaug |
| 2006/0294223 | A1 | 12/2006 | Glasgow et al. |
| 2007/0005928 | A1 | 1/2007 | Trika et al. |
| 2007/0033335 | A1 | 2/2007 | Maeda et al. |
| 2007/0088659 | A1 | 4/2007 | Phillips |
| 2007/0100893 | A1 | 5/2007 | Sanders |
| 2007/0112862 | A1 | 5/2007 | Iwatsu et al. |
| 2007/0156845 | A1 | 7/2007 | Devanneaux et al. |
| 2007/0156998 | A1 | 7/2007 | Gorobets |
| 2007/0157217 | A1 | 7/2007 | Jacobs et al. |
| 2007/0165933 | A1 | 7/2007 | Thomas et al. |
| 2007/0179854 | A1 | 8/2007 | Ziv et al. |
| 2007/0185899 | A1 | 8/2007 | Ziv et al. |
| 2007/0198716 | A1 | 8/2007 | Knowles et al. |
| 2007/0220220 | A1 | 9/2007 | Ziv et al. |
| 2007/0233947 | A1 | 10/2007 | Coulson et al. |
| 2007/0276949 | A1 | 11/2007 | Mergi et al. |
| 2008/0005459 | A1 | 1/2008 | Norman |
| 2008/0005657 | A1 | 1/2008 | Sneh |
| 2008/0010372 | A1 | 1/2008 | Khedouri et al. |
| 2008/0016174 | A1 | 1/2008 | Schiavone et al. |
| 2008/0046449 | A1 | 2/2008 | Lee et al. |
| 2008/0068998 | A1 | 3/2008 | Jaggi et al. |
| 2008/0077550 | A1 | 3/2008 | Shike |
| 2008/0082736 | A1 | 4/2008 | Chow et al. |
| 2008/0091878 | A1 | 4/2008 | Stern et al. |
| 2008/0098093 | A1 | 4/2008 | Simon et al. |
| 2008/0098169 | A1 | 4/2008 | Kaluskar et al. |
| 2008/0127355 | A1 | 5/2008 | Lorch et al. |
| 2008/0147808 | A1 | 6/2008 | Pang |
| 2008/0177935 | A1 | 7/2008 | Lasser et al. |
| 2008/0189796 | A1 | 8/2008 | Linn et al. |
| 2008/0201754 | A1 | 8/2008 | Arling |
| 2008/0208961 | A1 | 8/2008 | Kim et al. |
| 2008/0222348 | A1 | 9/2008 | Mosek |
| 2008/0235520 | A1 | 9/2008 | Becker et al. |
| 2008/0243773 | A1 | 10/2008 | Patel et al. |
| 2008/0244074 | A1 | 10/2008 | Baccas et al. |
| 2008/0244201 | A1 | 10/2008 | Heintel et al. |
| 2008/0263113 | A1 | 10/2008 | Krishnaiyer et al. |
| 2008/0281883 | A1 | 11/2008 | Cannon et al. |
| 2009/0055351 | A1 | 2/2009 | Whitehorn et al. |
| 2009/0089366 | A1 | 4/2009 | Toth |
| 2009/0132621 | A1 | 5/2009 | Jensen et al. |
| 2009/0181655 | A1 | 7/2009 | Wallace et al. |
| 2009/0204682 | A1 | 8/2009 | Jeyaseelan et al. |
| 2009/0210631 | A1 | 8/2009 | Bosworth et al. |
| 2009/0222117 | A1 | 9/2009 | Kaplan et al. |
| 2009/0234865 | A1 | 9/2009 | Gillum et al. |
| 2009/0327712 | A1 | 12/2009 | Sarig |
| 2010/0017557 | A1 | 1/2010 | Nakanishi et al. |
| 2010/0030963 | A1 | 2/2010 | Marcu et al. |
| 2010/0049758 | A1 | 2/2010 | Kumar |
| 2010/0115048 | A1 | 5/2010 | Scahill |
| 2010/0121712 | A1 | 5/2010 | Shahshahani et al. |
| 2010/0146187 | A1 | 6/2010 | Grimsrud et al. |
| 2010/0153474 | A1 | 6/2010 | Raines et al. |
| 2010/0235329 | A1 | 9/2010 | Koren et al. |
| 2010/0235473 | A1 | 9/2010 | Koren et al. |

(56) References Cited

U.S. PATENT DOCUMENTS

| | | | |
|---|---|---|---|
| 2011/0010497 | A1 | 1/2011 | Bryant-Rich et al. |
| 2011/0099326 | A1 | 4/2011 | Jung et al. |
| 2011/0179143 | A1 | 7/2011 | Yairi |

FOREIGN PATENT DOCUMENTS

| | | |
|---|---|---|
| EP | 0 492 106 | 4/2000 |
| EP | 1211861 | 6/2002 |
| EP | 1 308 853 | 5/2003 |
| EP | 1 445 703 | 8/2004 |
| EP | 1489510 | 12/2004 |
| EP | 1 923 780 A1 | 5/2008 |
| EP | 2 249 254 | 11/2010 |
| EP | 2 249 254 A2 | 11/2010 |
| FR | 2793576 | 5/1999 |
| GB | 2349546 | 11/2000 |
| GB | 2350973 | 12/2000 |
| JP | 2005 169861 | 6/2005 |
| KR | 1020090012308 | 2/2009 |
| WO | WO 00/41510 | 7/2000 |
| WO | WO 02/060154 | 8/2002 |
| WO | WO 02/100117 | 12/2002 |
| WO | WO 03/021441 | 3/2003 |
| WO | WO 03/094474 | 11/2003 |
| WO | WO 2004/068369 | 8/2004 |
| WO | WO 2005/022942 | 3/2005 |
| WO | WO 2005/109302 | 11/2005 |
| WO | WO 2007/044899 | 4/2007 |
| WO | WO 2007/117251 | 10/2007 |
| WO | 2007/146763 A2 | 12/2007 |
| WO | WO 2007/138584 | 12/2007 |
| WO | WO 2007/146763 | 12/2007 |
| WO | WO 2009/088709 A2 | 7/2009 |
| WO | 2009/105280 A2 | 8/2009 |
| WO | WO 2009/105280 | 8/2009 |
| WO | WO 2010/074848 | 7/2010 |
| WO | WO 2010/104814 | 9/2010 |

OTHER PUBLICATIONS

Han et al., "EMCEM: An Efficient Multimedia Content Encryption Scheme for Mobile Handheld Devices", *Information Science and Security*, Jan. 1, 2008, pp. 108-114.
Office Action for U.S. Appl. No. 12/336,089 dated Jan. 4, 2013, 17 pages.
Notice of Allowance for U.S. Appl. No. 12/645,149 dated Oct. 11, 2012, 9 pages.
Office Action for U.S. Appl. No. 12/645,194 dated Dec. 20, 2012, 24 pages.
Office Action for U.S. Appl. No. 12/645,194 dated Jun. 4, 2013, 25 pages.
Office Action for U.S. Appl. No. 12/720,006 dated Jan. 9, 2013, 11 pages.
Office Action for U.S. Appl. No. 12/720,006 dated May 20, 2013, 11 pages.
Office Action for U.S. Appl. No. 12/895,397, dated Dec. 5, 2012, 11 pages.
Notice of Allowance for U.S. Appl. No. 12/895,397 dated May 23, 2013, 9 pages.
Notice of Allowance for U.S. Appl. No. 12/895,428 dated Feb. 14, 2013, 8 pages.
Office Action for U.S. Appl. No. 13/172,589 dated Jan. 4, 2013, 17 pages.
Office Action for U.S. Appl. No. 13/327,383 dated Jan. 18, 2013, 13 pages.
Office Action for U.S. Appl. No. 13/327,383 dated Jun. 14, 2013, 13 pages.
Office Action for Chinese Patent Application Serial No. 2010800035852 dated Feb. 5, 2013, 5 pages.
International Report on Patentability for PCT/US2011/047047 dated Feb. 28, 2013, 8 pages.
International Preliminary Report on Patentability for PCT/US2011/047270 dated Feb. 28, 2013, 10 pages.
International Search Report and Written Opinion for PCT/US2012/020767 dated Nov. 13, 2012, 20 pages.
International Search Report and Written Opinion for PCT/US2012/024400 dated Aug. 8, 2012, 14 pages.
Cheng, Jieyin, et al., Streamto: Streaming Content Using A Tamper-Resistant Token, dated Dec. 12, 2005 (18 pages).
Han, JungKyu, et al., EMCEM: An Efficient Multimedia Content Encryption scheme for Mobile handheld devices, dated Jan. 1, 2008 (7 pages).
International Search Report and Written Opinion issued in international application No. PCT/US2012/024400, mailed on Aug. 8, 2012 (14 pages).
Office Action for U.S. Appl. No. 12/336,089, dated Jul. 25, 2012, 17 pages.
Office Action for U.S. Appl. No. 12/645,149, dated May 8, 2012, 9 pages.
Office Action for U.S. Appl. No. 12/645,194, dated Aug. 22, 2012, 30 pages.
Office Action for U.S. Appl. No. 12/720,282, dated May 1, 2012, 12 pages.
Office Action for U.S. Appl. No. 12/720,333, dated May 11, 2012, 7 pages.
Office Action for U.S. Appl. No. 12/796,267, dated Jul. 30, 2012, 23 pages.
Office Action for U.S. Appl. No. 12/895,428, dated May 25, 2012, 15 pages.
Office Action for U.S. Appl. No. 13/172,589, dated Jul. 26, 2012, 15 pages.
International Search Report and Written Opinion for PCT/US2011/047047, dated May 8, 2012, 12 pages.
International Search Report for PCT/US2012/020502, dated Jul. 10, 2012, 3 pages.
Written Opinion for PCT/US2012/020502, dated Jul. 10, 2012, 6 pages.
Partial International Search Report and Invitation to Pay Additional Fees for PCT/US2012/020767, dated Aug. 27, 2012, 9 pages.
"Android Data Caching", Process Fork, http://processfork.blogspot.com/2010/04/android-data-caching.html, Apr. 21, 2010, 2 pages.
"Cisco MDS 9000 Series Caching Services Module with IBM TotalStorage™ SAN Volume Controller Storage Software for Cisco MDS 9000", Cisco Systems, Inc., http://www.cisco.com/warp/public/cc/pd/ps4159/ps4358/prodlit/md9ds_ds.pdf, printed on Dec. 7, 2010, 9 pages.
"Persistant Caching", IBM® Cognos® 8 Virtual Manager Installation and Configuration Guide, http://publib.boulder.ibm.com/infocenter/c8bi/v8r4m0/index.jsp?topic=/com.ibm.swg.im.cognos.vvm_installation_guide.8.4.0.doc/vvm_installation_guide_id1555PersistentCaching.html, Nov. 27, 2009, 1 page.
Cache Management for the IBM Virtual Taper Server, http://www-03.ibm.com/support/techdocs/atsmastr.nsf/WebIndex/FLASH10054, printed on Jan. 3, 2011, 5 pages.
Ex Parte Quayle Action for U.S. Appl. No. 12/644,885, dated Dec. 7, 2011, 5 pages.
International Report on Patentability issued in International Application No. PCT/IL2009/000752, mailed Feb. 17, 2011, 2 pages.
International Search Report and Written Opinion for PCT Patent Application Serial No. PCT/US2010/026596, dated Jul. 29, 2010, 15 pages.
International Search Report and Written Opinion for PCT Patent Application Serial No. PCT/US2009/065456, dated Apr. 9, 2010, 11 pages.
International Search Report and Written Opinion for PCT/US2011/047270, dated Dec. 20, 2011, 13 pages.
International Search Report for PCT/IB2011/001206, mailed Aug. 30, 2011, 5 pages.
Notice of Allowance for U.S. Appl. No. 12/644,885, dated Feb. 16, 2012, 9 pages.
Office Action for U.S. Appl. No. 12/020,553, dated Dec. 19, 2011, 20 pages.
Office Action for U.S. Appl. No. 12/020,553, dated May 12, 2011, 19 pages.

(56) References Cited

OTHER PUBLICATIONS

Office Action for U.S. Appl. No. 12/185,583, dated Jun. 6, 2011, 13 pages.
Office Action for U.S. Appl. No. 12/185,583, dated Jan. 31, 2012, 17 pages.
Office Action for U.S. Appl. No. 12/336,089, dated Apr. 13, 2011, 14 pages.
Office Action for U.S. Appl. No. 12/336,089, dated Oct. 31, 2011, 14 pages.
Office Action for U.S. Appl. No. 12/336,089, dated Mar. 22, 2012, 8 pages.
Office Action for U.S. Appl. No. 12/645,149, dated Jan. 26, 2012, 9 pages.
Office Action for U.S. Appl. No. 12/645,194, dated Dec. 8, 2011, 26 pages.
Office Action for U.S. Appl. No. 12/720,282, dated Dec. 1, 2011, 14 pages.
Office Action for U.S. Appl. No. 12/720,006, dated Nov. 14, 2011, 11 pages.
Office Action for U.S. Appl. No. 12/796,267, dated Feb. 10, 2012, 22 pages.
Office Action for U.S. Appl. No. 12/720,006, dated May 1, 2012, 11 pages.
Office Action for U.S. Appl. No. 13/172,589, dated Mar. 22, 2012, 9 pages.
Restriction Requirement for U.S. Appl. No. 12/494,758, dated Nov. 21, 2011, 6 pages.
The International Search Report and Written Opinion for PCT Patent Application Serial No. PCT/US2009/065056, dated Jul. 29, 2010, 35 pages.
Written Opinion for PCT/IB2011/001206, mailed Aug. 30, 2011, 6 pages.
Written Opinion of the International Searching Authority issued in International Application No. PCT/IL2009/000752, mailed Feb. 17, 2011, 4 pages.
Deng et al., "Architectures and Optimization Methods of Flash Memory Based Storage Systems", *Journal of Systems Architecture*, vol. 57, pp. 214-227, 2011.
Douglis et al., "Position: Short Object Lifetimes Require a Delete-Optimized Storage System", *Proceedings of the 11th Workshop on ACM SIGOPS European Workshop*, ACM, 2004, pp. 1-6.
International Search Report and Written Opinion dated May 7, 2008 for PCT Application Serial No. PCT/IL2008/000126, 12 pages.
International Search Report and Written Opinion dated Oct. 26, 2009 for PCT Application Serial No. PCT/IL2009/000752, 11 pages.
Jiang, Zhimei et al., "Web Prefetching in a Mobile Environment", IEEE Personal Communications, IEEE Communications Society, US, vol. 5, No. 5, Oct. 1998, pp. 25-34.
Notification Concerning Transmittal of International Preliminary Report on Patentability for International Application No. PCT/US2009/065456, dated Jun. 30, 2011, 9 pages.
Notification Concerning Transmittal of International Preliminary Report on Patentability for International Application No. PCT/US2009/065056, dated Jun. 30, 2011, 27 pages.
Notification Concerning Transmittal of International Preliminary Report on Patentability for International Application No. PCT/US2010/026596, dated Sep. 22, 2011, 10 pages.
Notification of Transmittal of the International Search Report and the Written Opinion of the International Searching Authority, or the Declaration for International Application No. PCT/US2011/047270, dated Dec. 20, 2011, 13 pages.
O'Hare, Gregory et al., "Addressing Mobile HCI Needs Through Agents", Proceedings of the 4th International Symposium on Human Computer Interaction with Mobile Devices and Services (MobileHCI'02), Pisa, Italy, 2002, pp. 311-314. Spinger Verlag LNCS 2411.
Reddy, Mike et al., An Adaptive Mechanism for Web Browser Cache Management, date unknown, 6 pages.
Rekkedal, S., "Caching of Interactive Branching Video in MPEG-4-Thesis for the Candidatus Scientiarum Degree", *University of Oslo Department of Informatics*, Jul. 12, 2004, 140 pages.
Rigoutsos et al., "Chung-Kwei: A Pattern-Discovery-Based System for the Automatic Identification of Unsolicited E-Mail Messages (SPAM)", *Proceedings of the First Conference on Email and Anti-Spam (CEAS), Bioinformatics and Pattern Discovery Group*, IBM, 2004.
U.S. Appl. No. 13/341,783, filed Dec. 30, 2011, entitled, "System and Method for Managing Discardable Objects", 54 pages.
U.S. Appl. No. 13/341,785, filed Dec. 30, 2011, entitled, "System and Method for Managing Discardable Objects", 54 pages.
U.S. Appl. No. 61/159,034, filed Mar. 10, 2009, entitled, "Smart Caching", Inventors: Judah Gamliel Hahn and David Koren (24 pages).
Xiang et al., "Cost-Based Replacement Policy for Multimedia Proxy Across Wireless Internet", IEEE Global Telecommunications Conference, GLOBECOM '01, San Antonio, TX, Nov. 25-29, 2001, pp. 2009-2013.
Yin et al., "A Generalized Target-Driven Cache Replacement Policy for Mobile Environments", Proceedings of the 2003 Symposium on Applications and the Internet (SAINT '03), pp. 1-20.

\* cited by examiner

METHOD AND APPARATUS FOR PROTECTING CACHED STREAMS

CROSS-REFERENCE TO RELATED APPLICATIONS

This application claims the benefit of U.S. Provisional Application Ser. No. 61/447,594, filed Feb. 28, 2011, the entirety of which is hereby incorporated herein by reference.

BACKGROUND

Numerous mobile devices are currently available that allow a user to send and receive data and stay connected with work, family and friends with relatively few geographical restrictions on the user. The widespread availability of sophisticated mobile devices, such as smart phones or mobile computing devices, coupled with the increased availability of high quality wireless networks, has led to a demand for more access to online content by mobile device users. Online content in the form of streamed data may now be routinely accessed and consumed by mobile device users over various wireless networks. To avoid potential variations in connection quality, or even loss of connectivity, during playback, some mobile devices may cache streamed data locally for later playback.

While caching of data can improve user experience, the data may have restrictions associated with it that cannot be readily enforced if it is cached. For example, if the online content is subject to Digital Millennium Copyright Act (DMCA) restrictions in the United States, the content provider may be required to remove access to online content upon notice from a content owner of potential copyright infringement. Alternatively, content may be subject to geographical licensing restrictions, in which the content is freely available only in certain regions and cannot be consumed outside of these regions. When content is streamed online for immediate consumption, the server can easily restrict service by simply not streaming the content if it is restricted or removed. If the content is cached, it becomes more difficult to impose these restrictions. One way to resolve this issue is via digital rights management (DRM) software. However, DRM requires infrastructure changes on the content provider server and typically carries a per-copy license fee to the DRM provider. This may be impractical for user-generated content services such as YOUTUBE and FLICKR.

SUMMARY

In order to address the problem of handling enforcement of restrictions on, or removal of access to, streamed content in a system that caches streamed content, a system and method for protecting cached streams is disclosed.

According to one aspect, a method for protecting streamed content that has been stored locally on a storage device associated with a host is disclosed. The method may include, in a processor of the host, requesting streamed content from a content server, and creating an encryption key from a portion of the streamed content. The portion of the streamed content used to create the encryption key may be downloaded at a different bit rate than the bit rate at which the streamed content is downloaded for storage on the storage device. The processor may determine if the protocol between the content server and a user agent on the host is unreliable and, if so, repeatedly retrieve portions of the streamed content sufficient to create the encryption key until enough of the portions retrieved have been reliably retrieved to form the key. The streamed content is then encrypted with the key and stored in the storage device with an encrypted version of the key, where the encrypted version of the key is encrypted with the retrieved portion of the streamed content and also stored in the storage device. The unencrypted key is then discarded. In alternative embodiments, one or more overlay keys may be used to generate a combined encryption key with the encryption key generated from a portion of the streamed content.

In another aspect, a method of decrypting streamed content is disclosed where, in a processor of a host device, upon receiving a request to playback encrypted streamed content, an encrypted key is retrieved from a storage device associated with the host and the encrypted key is decrypted by requesting an unencrypted version of the encrypted streamed content from a content server. Portions of the unencrypted version of the streamed content are received over an unreliable protocol and used to decrypt the encrypted key. Upon decryption of the encrypted key, the decrypted key is used to decrypt the encrypted streamed content on the storage device and play back an unencrypted version of the encrypted streamed content from the storage device. In alternative embodiments, the storage device or the host may manage encryption and decryption processes.

According to another aspect, a host is disclosed having a processor and a user agent, the user agent configured to communicate with a content server containing streamed content and the processor configured to encrypt and decrypt streamed content according to the methods disclosed above. In yet another aspect, a storage device is disclosed for use in a host that is configured to communicate with a content server to obtain streamed data, and store the streamed data on the storage device, where the storage device is configured to encrypt and decrypt the streamed data in accordance with the methods disclosed above.

DETAILED DESCRIPTION OF THE PRESENTLY PREFERRED EMBODIMENTS

Figure 1:
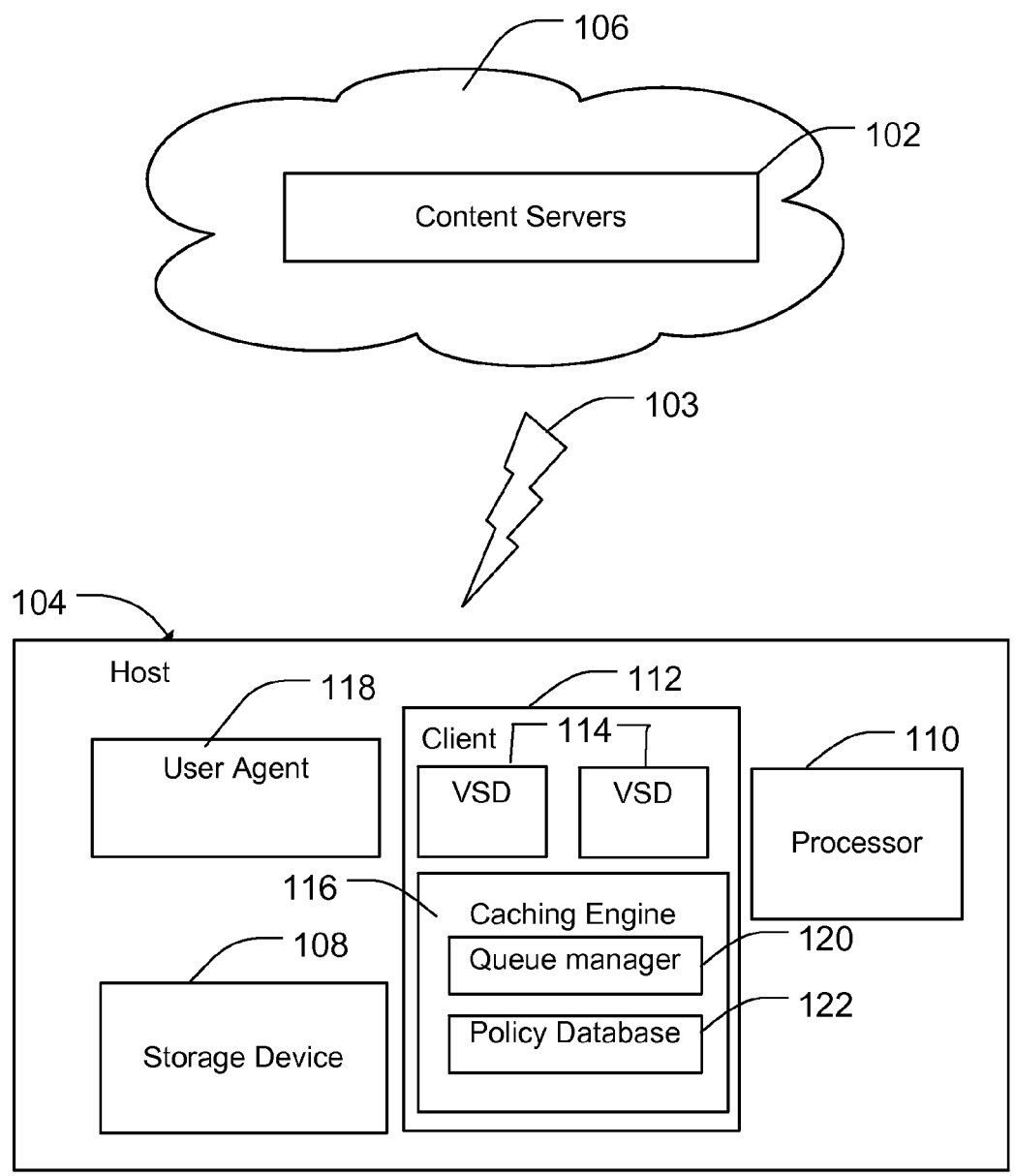
FIG. 1 is a block diagram of a system that may implement aspects of the invention.

A suitable system for implementing methods for protecting streamed data is illustrated in FIG. 1. In the system, a content server or collection of servers 102 in a network 106 may be in communication over wired or wireless communications links 103 with a host 104. The host may be a mobile device such as any of a number of data handling devices including, but not limited to a tablet computer, mobile phone, personal digital assistant, home network router, or a personal computer. A communication channel between the content server or servers 102 and the host 104 may be via any of a number of available wired or wireless interfaces. The host 104 may include an integrated or removable storage device 108. The storage device 108 may be a non-volatile memory. One suitable type of a non-volatile memory is a flash memory card. The host 104 may alternatively, or additionally, be coupled to an external storage device (e.g. flash memory card or USB flash drive coupled via a memory card slot or USB interface) suitable for holding cached streamed content. The term streamed data (or streamed content) is generally used herein to refer to data that is capable of being streamed for consumption at a real-time streaming bit rate, but that may be transferred, for example pre-fetched from a content server and cached in a storage device, at a bit rate other than the bit rate at which it would be transmitted for real-time consumption.

The host 104 includes a processor 110 for executing a client application 112 that may include one or more virtual storage devices 114 and a caching engine 116. A user agent 118, such as a video playback application, may also be stored on the host. The user agent 118 may be a browser or other user interface that allows access to streamed content with the host 104. Any number of available types of browsers, such as Internet Explorer, Safari, YouTube handset application, or Chrome may be used in this context. The caching engine 116 may be software for managing the timing and handling of data a user wishes to download. The sources of data desired by a user may be stored in a queue manager 120 in the caching engine 116 for managing and prioritizing user requests for downloading data from the one or more sources. The download of data from the source identified in the queue manager 120, such as a content server 102, would be initiated based on the rules for that source set out in an integrated or remote policies database 122. For example, rules may be associated with a streamed video of a television episode to be cached in the storage device 108. The rules in the policy database 122 pertaining to the source may be to only download and store the latest episode after a certain date when the host 104 is otherwise idle, or to download and store the episode when the host 104 is in communication with a content streaming server 102 over an advantageous type of network connection (e.g. cost or bandwidth), or so on.

The virtual storage device (VSD) 114 may be implemented as an abstraction layer application programming interface (API) representing the storage device 108 and acting as a driver for the storage device 108. The virtual storage device 114 may also be implemented with additional capabilities such as auto-backup, re-encryption or other functionality. The client application 112 may be already resident on the host 104, or downloaded in whole or in part from a remote source prior to or concurrently with downloading of streamed content. In yet other alternative embodiments, some or all of the client application 112 may be retrieved from the storage device 108 that may be coupled with the host 104.

In order to protect the streamed data and allow content servers to control access of data that is downloaded by the host and stored locally on the storage device associated with the host, disclosed herein is a mechanism for encrypting streamed data stored on the storage device 108 of the host 104 such that future playback of the streamed content that is cached on the host 104 is dependent on a key that must be recreated by accessing the streamed content again from the content server 102 to recreate the key that was used to encrypt the streamed content when it was first cached. Thus, by not storing the key generated at the host 104 and requiring that the host contact the content server 102 to stream some of the cached streamed content and recreate the key, the content server 102 can control the ability of the host to play back cached streamed data even though the streamed data is already cached locally on the storage device 108 associated with the host 104. As described in greater detail below, in one implementation the technique for deriving a key from the streamed data allows for a certain number of erroneous bits that may be retrieved if the protocol used to transfer the streamed data is an unreliable data protocol.

Figure 2:
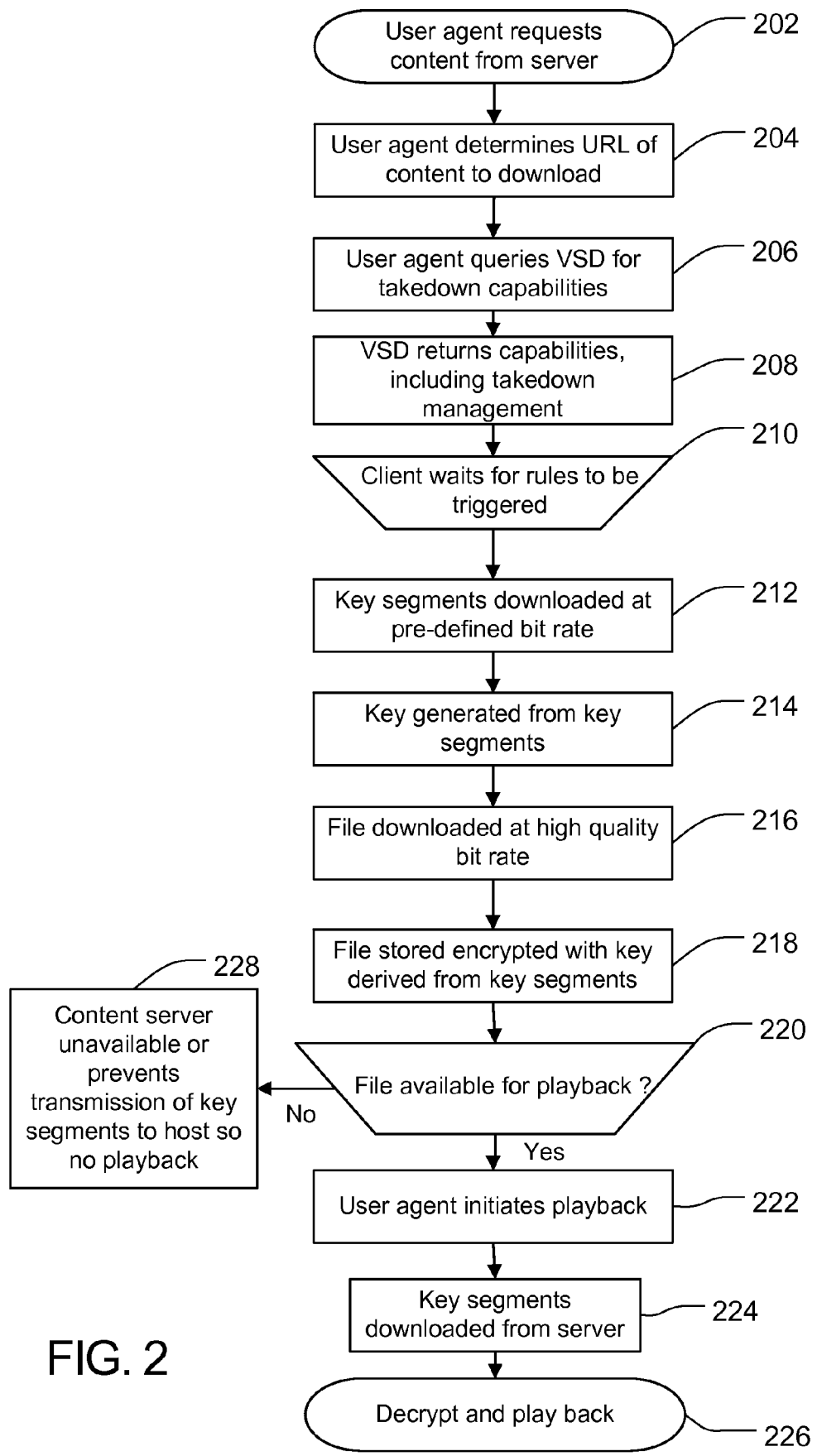
FIG. 2 is a flow diagram illustrating one embodiment of a method for protecting a streamed data cached locally on a storage device.

In one embodiment, as best seen in FIG. 2, a process of downloading and encrypting the downloaded streamed content is presented. When the user agent 118 first requests content from a content server (at 202) the user agent 118 determines the universal resource locator (URL) of the content to be downloaded. This may be accomplished for example by an internal algorithm on the client application 112 in the host 104 or, as in a YouTube request, via a communication directly with the content server (at 204). In one particular implementation, the user agent 118 may then query the virtual storage device 114 on the host 104 for its takedown capabilities, wherein the "takedown" capability refers to the ability of the virtual storage device 114 for the host 104 to prevent playback of data restricted by a content server (at 206). The takedown capability may include the ability of the virtual storage device 114 to completely eliminate all local copies of content in response to a takedown command. Also, in one alternative embodiment, the host 104 may contain more than one virtual storage device 114, each with different capabilities. For example, two different virtual storage devices may be present, one with takedown capabilities and one without, where the user agent may select the virtual storage device with the takedown capabilities.

The user agent query may return a flag or a file from the virtual storage device 114 simply noting that the capability exists or providing further details on the capability. In addition, other capabilities of the virtual storage device 114, such as auto backup or other functions, may also be returned in response to the user agent 118 query (at 208). At this point, the caching engine 116 of the client 112 will compare the user request for content against the rules for triggering download to determine what to download and when to download (at 210). The caching engine 116 of the client 112 may use rules from the policy database 122 to control downloads. For example, rules concerning when to download based on time of day, bandwidth available, power level of the mobile device, or any of a number of other parameters utilized by the caching engine 116. The caching engine 116 handles system-generated downloads and user-initiated content downloads from content servers 102 in various remote locations.

Once the request for content has been processed and the caching engine 116, pursuant to the rules being implemented for downloading, have been triggered, key segments are downloaded from the content server 102 at a predefined bit rate (at 212). The predefined bit rate may be the lowest available bit rate known to be available to the host. The lowest bit rate information may be information provided to the host by the content server. The key segments are fragments of streaming data retrieved from the server 102. Thus, the key fragments may be portions of the content that is to be cached, for example video content. In one embodiment, a small portion of the beginning of the stream is retrieved at a low bit rate and that segment is hashed to return an encryption key. Although the encryption key may be generated from a single portion of the beginning of the stream of streamed data if a reliable protocol, such a transmission control protocol (TCP)-based protocol, is being used, and the subsequent downloaded data may be simply encrypted with that key from the single segment, it is expected that an unreliable data protocol may be involved and thus the modification such as shown in FIG. 2 may be required. One example of an unreliable protocol is User Datagram Protocol (UDP).

Streaming is inherently unreliable, and it is possible that the same stream retrieved multiple times from a content server 102 may result in a different set of bits. Therefore, in a second embodiment of this invention, multiple segments of the key are derived from different portions of the stream. Each segment may be used to decrypt a partial shared secret, which is used to form the final key. This is illustrated in FIG. 3.

Returning again to FIG. 2, after downloading the key segments at a predefined bit rate, a key is generated from the key segments and the file is downloaded at a high quality bit rate, and subsequently the file is stored encrypted based on the key derived from the key segments (at 214-218). A high quality bit rate is defined herein as a bit rate suitable for viewing data at the best rate the destination device (host) can manage over a Wi-Fi connection. For example, if a host can process and display video at bit rates of 80 kbps through 2.5 Mbps, the high quality bit rate would be 2.5 Mbps. Although the streamed content (also referred to herein as a file) is encrypted and stored in the storage device associated with the host while the unencrypted key is discarded from the host 104. Thus, the file is available for playback but requires generation of a new key and decryption with that key to go forward. At such time as a user agent 118 for the host 104 requests playback, the host 104 goes back to the content server 102 to download key segments, regenerate the key and then decrypt and play back the encrypted cached streamed content (at 220-226).

If, however, after requesting playback the content server is unavailable or does not wish to allow playback, then the key segments that have been requested for download will not be downloaded thus preventing the host from generating a new key and decrypting or playing the encrypted streamed content (at 220, 228). As noted above, reasons for the content server 102 to refuse further download of the streamed content could be implementation of a takedown requirement because a copyright owner had identified infringement and notified the entity controlling the content server 102 or could be based on the fact that the content server 102 identifies that the host 104 is no longer in a geographic region for which playback is permitted for that particular content. Information as to the geographic region of the host would generally be determined by the content server 102 based on the location of the server through which the host 104 sent the request for playback time. Although it is contemplated that the host 104 may send its own location information in other implementations, the location of the server through which the host makes the playback request is considered more reliable and less prone to manipulation. The Internet protocol (IP) address of the server used by the host 104 to query the content server 102 may be used to locate the server and provide the necessary geographic location to determination at the content server whether that geographic location is permitted to receive the requested streamed content. Thus, the cached streamed content stored in the storage device is protected by an encryption key, which may be generated from the streamed content itself as discussed below, so that the content server controls the ability of the host 104 to replay the cached streamed content by controlling access to the streamed content used to generate the key when playback is subsequently requested by the user agent 118.

Figure 3:
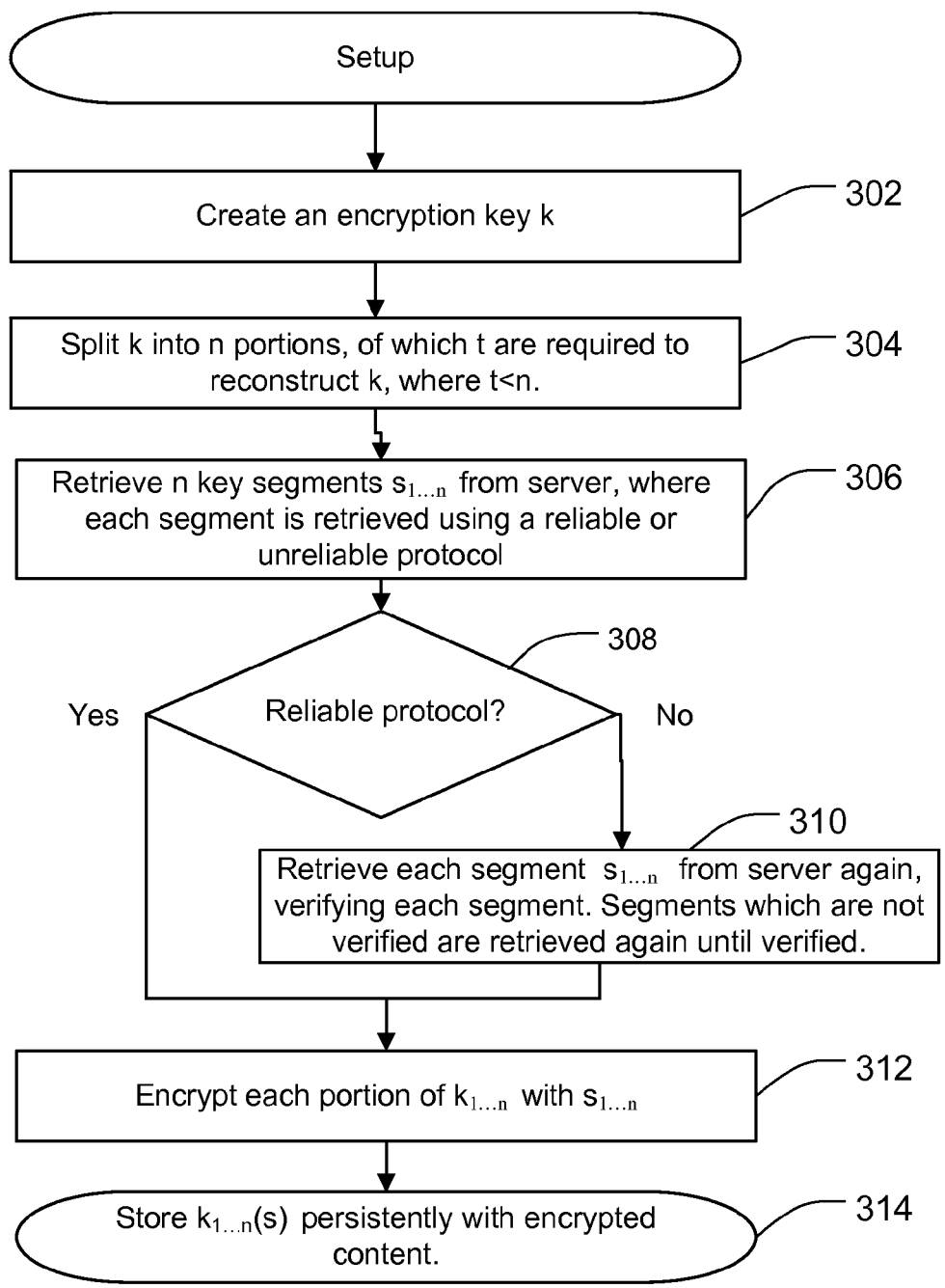
FIG. 3 is a flow diagram illustrating a method of deriving an encryption key from streamed content for use in the method of FIG.

Turning to FIG. 3, a method of using multiple segments of streamed data to create an encryption key for the streamed data is shown. The method of FIG. 3 may be executed by the virtual storage device of the client in the host. Upon a request by a user agent 118 either directly or as a proxy for a content server 102 to create an encryption key k (at 302), the process of creating the key k is initiated where streamed data with which to create key k is split into n portions of which t are required to reconstruct k, where t<n (at 304). This may be done using a secret sharing algorithm such as Shamir (as described in "How to share a secret", *Communications of the ACM* 22 (11): 612-613), or Asmuth-Bloom ("A modular approach to key safeguarding", C. A. Asmuth and J. Bloom. *IEEE Transactions on Information Theory*, IT-29(2):208-210, 1983), among others. First, n key segments $s_{1...n}$ are retrieved from the content server (at 306), where each segment is retrieved using a reliable or unreliable protocol. As noted above, a reliable protocol may be a TCP-based protocol where, if a packet is dropped, it is re-requested and corrected. In contrast, an unreliable protocol may be the UDP-type protocol where there is no guarantee of reliability. After retrieving the n key segments, the host may determine if the protocol is a reliable protocol (at 308). If a reliable protocol is detected then each portion of encryption key k is encrypted with the corresponding segment s and the encrypted key k(s) is stored with the encrypted streamed content in the storage device (at 312, 314).

If instead of a reliable protocol, an unreliable protocol is detected such as UDP, then each segment $s_{1...n}$ is retrieved from the content server again, to verify each segment. Segments which are not verified are retrieved (e.g. which do not repeatably match) again until verified (at 310). After verification, the next steps of encrypting each portion of key k with corresponding segment s and then storing encrypted key k(s) persistently with encrypted content is undertaken (at 312, 314).

Figure 4:
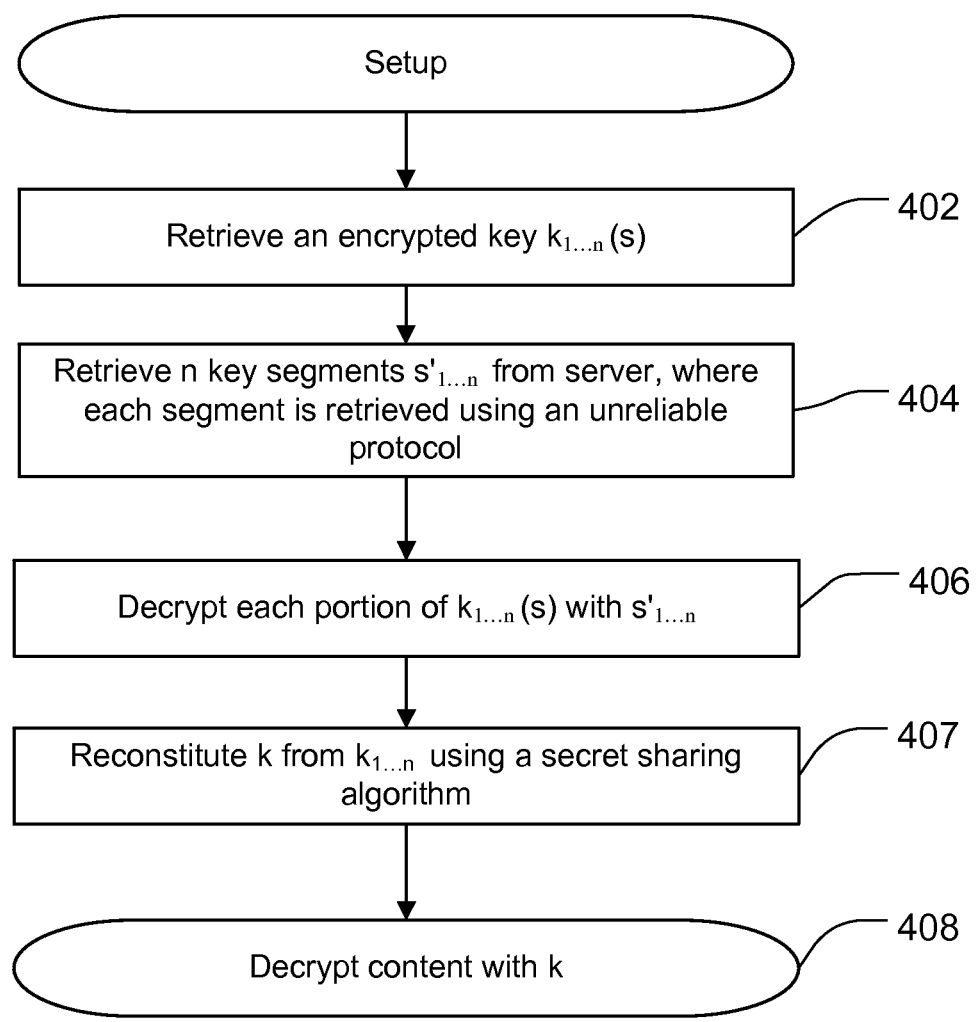
FIG. 4 is a flow diagram illustrating a method of decrypting the encrypted key formed in the process of FIG. 3

Once the unencrypted key is created, the key k is only maintained in the host 104 long enough to encrypt the streamed content and then is discarded rather than saved in the storage device 108 or host 104. Referring again to FIG. 2, at the point where the user agent 118 initiates playback by requesting key segments to again be downloaded, assuming that there has been no takedown provision enforced by the content server or other restriction that prevents download, the key can then be again derived using an unreliable protocol such as UDP as shown in FIG. 4. The first step in the process is to retrieve the encrypted key k(s) and then retrieve n key segments $s_{1...n}$ from the content server where each segment is retrieved using an unreliable protocol (at 402, 404). Each portion of the key k(s) is decrypted with each respective segment $s_{1...n}$ (at 406). The unencrypted key k is then reconstituted from the elements $k_{1...n}$ that are recovered from this step using a secret sharing algorithm as noted in FIG. 3 at step 304, where t portions are required to reconstruct k and where t<n (at 407). After decrypting the key k(s) the streamed content is decrypted with k and played back by the user agent 118 on the host 104 (at 408). In one implementation it is preferred that, for the encryption and decryption process of FIGS. 3-4 to work properly, that a threshold value t (i.e. the minimum number of portions required to reconstruct unencrypted encryption key k) should be set sufficiently low to allow for errors in the unreliable stream. In general, parameters t and n are known parameters to the client 112 of the user agent 118 and are a constant and also known to the host 104.

A secret sharing protocol may be used for the encryption and decryption mechanism to allow for both reliable and unreliable download protocols. Although any of a number of encryption protocols known to those of skill in the art may be implemented, one suitable secret sharing protocol is the Shamir secret sharing scheme. The key generation process of FIG. 3, as well as the key re-generation process described in FIG. 4, involve splitting the key k into multiple segments ($k_{1...n}$) using a secret sharing technique so that the encrypted key k(s) may be processed one segment at a time with the corresponding streamed data segment $s_{1...n}$ obtained from the content server. Also, the key utilized in the embodiments of FIGS. 3-4 and generated with a secret sharing protocol is dependent on the bit rate and so the key segments are intentionally downloaded by the host at a bit rate that is lower than the highest available bit rate that can be rendered on the host 104 under the assumption that a lower bit rate may only be available when a user decides to play back previously cached content. This assumed bit rate available for later download will always be lower to allow for more flexibility if the later bit rate is indeed a low bit rate. In an alternative embodiment, the content to be cached may be intentionally downloaded by the host at a bit rate that is lower than the highest available bit rate that can be rendered by the host, while the key utilized in the embodiments of FIGS. 3-4 may be created from a portion of the same content downloaded at a higher bit rate than the bit rate of the content to be cached. Using a different bit rate for the key than for the content reduces the predictability of the key and may therefore increase the strength of the encryption.

Again, in a situation where a reliable protocol is available, the ordinary mechanism for key generation may be to hash the content to create a key and, because it's a reliable protocol, the same key will be guaranteed each time because the data downloaded is reliable and so no splitting up of the key into portions and segments is necessary. Because and unreliable protocol such as UDP is by definition unreliable, the bits downloaded at any given time may not match all the bits downloaded previously such that only a certain number of segments of the key may be identical to previously downloaded segments of the key. By using multiple segments as described above and relying on repeated download of the same bits and comparison to the previously downloaded bits until enough matches are made, a high confidence, although not a guarantee, that an accurate key has been generated may be developed for instances where only an unreliable protocol is available.

Figure 5:
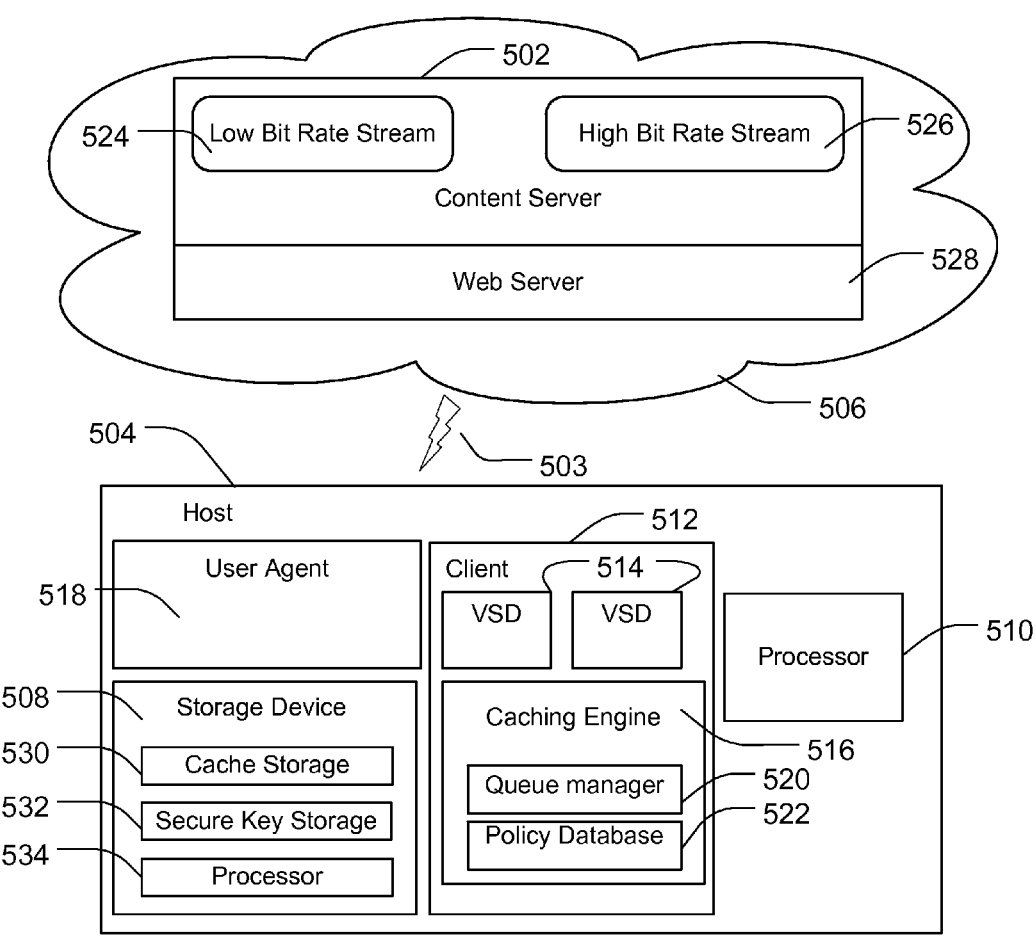
FIG. 5 illustrates an alternative embodiment of the system of FIG. 1.

Although the description above refers to actions executed by the processor of the host following instructions of the client for user agent, embodiments are also contemplated in which the storage device (built-in, removable from, or external to, the host) may include built-in cryptographic capabilities, secure storage for keys and a pseudo-random or true random number generator that can be used to generate encryption keys. For example, referring to FIG. 5, an alternative system is shown where a content server 502 in a network 506 may provide a low bit rate stream 524 or a high bit rate stream 526 via a web server 528 to the host 504 via a wired or wireless communication link 503. The host 504 includes a playback application that acts as a user agent 518, a storage device 508 and a client application 512 in communication with a host processor 510. Similar to the embodiment of FIG. 1 discussed above, the user agent 518 may include one or more virtual storage devices (VSD) 514 and a caching engine 516. The caching engine may include a queue manager 520 and a policy database 522 for handling downloads. The storage device 508 of FIG. 5 includes cache storage 530, a secure key storage 532, and a processor 534. As described below, although the storage device 508 may be recited as carrying out particular steps, in one embodiment it is the processor 534 of the storage device 508 carrying out the recited steps in conjunction with firmware or software resident in the processor 534 or the storage device 508 generally. Also, although the host 504 is shown with an internal storage device, as mentioned above, in various embodiments the storage device 508 can be embedded, removable or external to the host 504.

In this embodiment, while it is assumed that the storage device 508 cannot issue a direct HTTP request, the storage device 508 can operate a user agent 518 to do so on its behalf. In this embodiment, the processor 534 of the storage device 508 may be configured to provide a secure location for the generation of keys. The processor may also be configured to transparently decrypt content when a key is provided and provide this decrypted content to the host 504 for playback. Furthermore, the storage device 508 of the embodiment of FIG. 5 may derive the key from a provided stream in a manner somewhat similar to that executed by the processor 110 of the host 104 in the embodiment of FIG. 1. A key stream is a low bit rate stream requested for the purpose of deriving key segments as describe previously. The actual algorithm used to select key segments from the key stream may be unique to the storage device 508 and does not need to be known to the host 504. For example, the algorithm may be instructions to take certain parts of the streamed content, such as every third 4k segment from a 64 k stream or based on some other pattern, based on a hash algorithm or any of a number of other parameters. Because neither the storage device processor 534 nor the content server 502 can initiate commands, the user agent 518 may drive communication with both the server and the storage device 504. The user agent 518 may initiate the process as shown.

Figure 6:
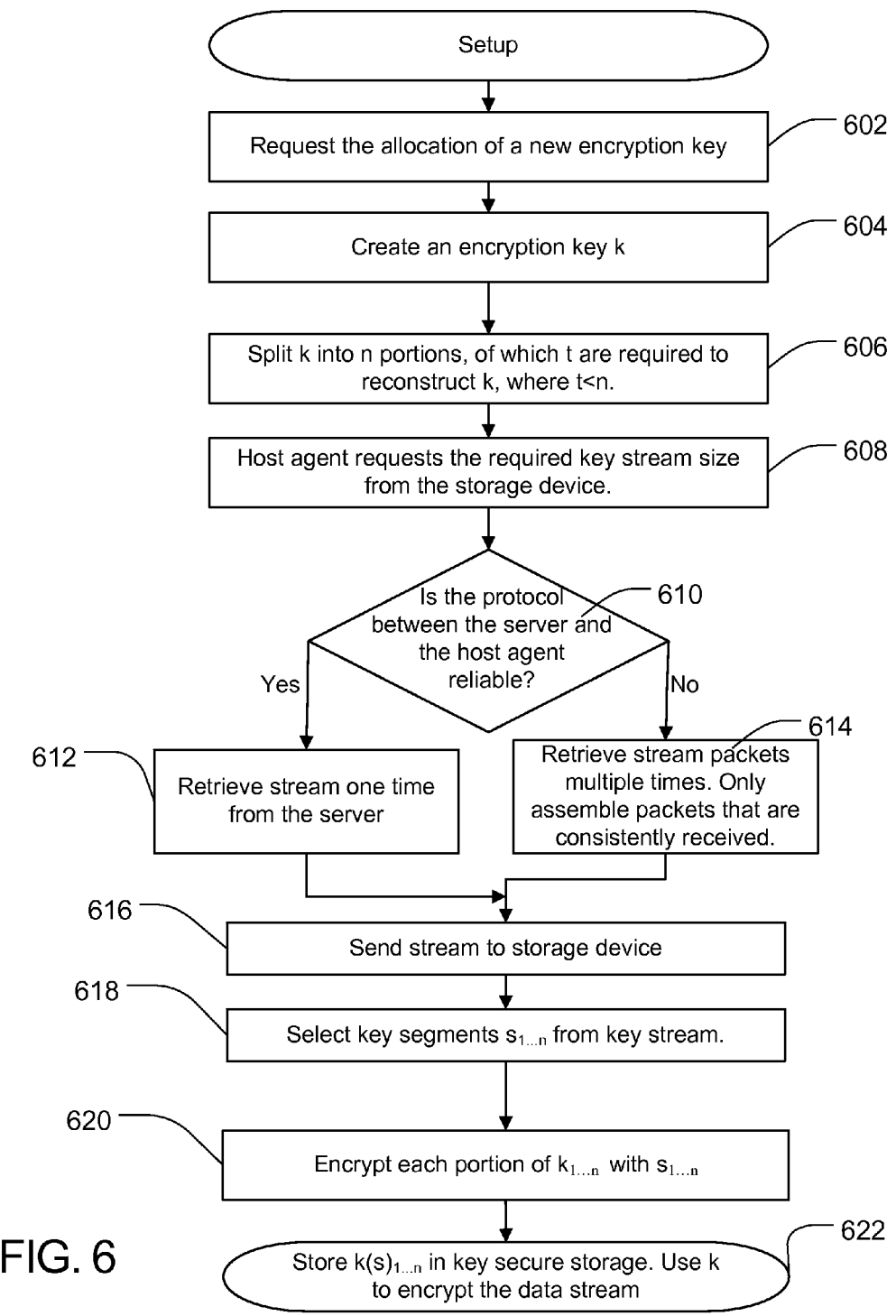
FIG. 6 is a flow diagram illustrating an alternative implementation of the method of FIG. 2 for use in the system of FIG. 5.

Referring to FIG. 6, the storage device 508 of may work with the user agent 518 to create a key by first requesting the allocation of a new encryption key (at 602) and then beginning the process of creating the new encryption key (at 604). In the same manner described in the host version of FIG. 3, although now performed by the storage device 508 rather than the host 104, the key k is split into n portions, t of which are needed to reconstruct k, where t<n (at 606). The user agent 518 then requests the required key stream size from the storage device 508, the required stream size dependent on the needs of the particular key segment selection algorithm utilized by the host where the required key stream size may be communicated to the user agent 118 by the virtual storage device 114 (at 608). As in the embodiment of FIG. 3, the client application 512 on the host 504 determines if the protocol between host 504 and content server 502 is a reliable or unreliable format (at 610). If reliable, then the user agent 518 will receive the stream (having the stream size identified by the storage device 508 as necessary) only one time and will send that stream on to the storage device 508 (at 612, 616). If the protocol is determined by the user agent 518 to be unreliable, the stream packets making up the key stream size will be retrieved multiple times until verified as described previously and then sent to the storage device 508 once the packets of the stream are consistently received (at 614, 616).

Once the key stream has been received at the storage device 508, the storage device 508 will then select key segments $s_{1...n}$ from the key stream, encrypt each portion of key k with the segments s, store encrypted key k(s) in the secure key storage area 532 and use k to encrypt the streamed data (at 618-622). Playback may be accomplished using the same mechanism as the host-only environment described with respect to FIG. 4, with the exception that the key stream is provided to the storage device 508 as-is and the storage device 508 does the key derivation and manipulation.

In addition to the host-only processing and storage device processing embodiments for using reliable or unreliable protocols to generate an encryption key using one or more segments of the streamed content itself, additional embodiments are contemplated where the key generated from the streamed content is combined with another key from another source, where this key from another source is hereinafter referred to as an overlay key. For example, in one embodiment the overlay key may be a hardware key derived from a subscriber identity module (SIM) card or host hardware to also prevent the streamed content cached in the storage device from being copied to another storage device. Using a hardware key derived from the SIM card would provide the network operator that issues the SIM card the ability to control a subscriber based on subscriber status. This added protection for the network operator prevents a user from switching memory cards and unlocking the streamed content cached in the memory card. Alternatively, the overlay key may be a host binding key so that rather than binding the cached streamed data to a SIM card, the key derived from the streamed content as previously described would be combined with a key created by host-unique parameters. Examples of such parameters include host serial number, chipset information for the host, international mobile equipment identity (IMEI) information and so on. Furthermore, it is contemplated that both a host-specific key and a SIM-based key may be combined with the key derived from the streamed content in another embodiment.

Figure 7:
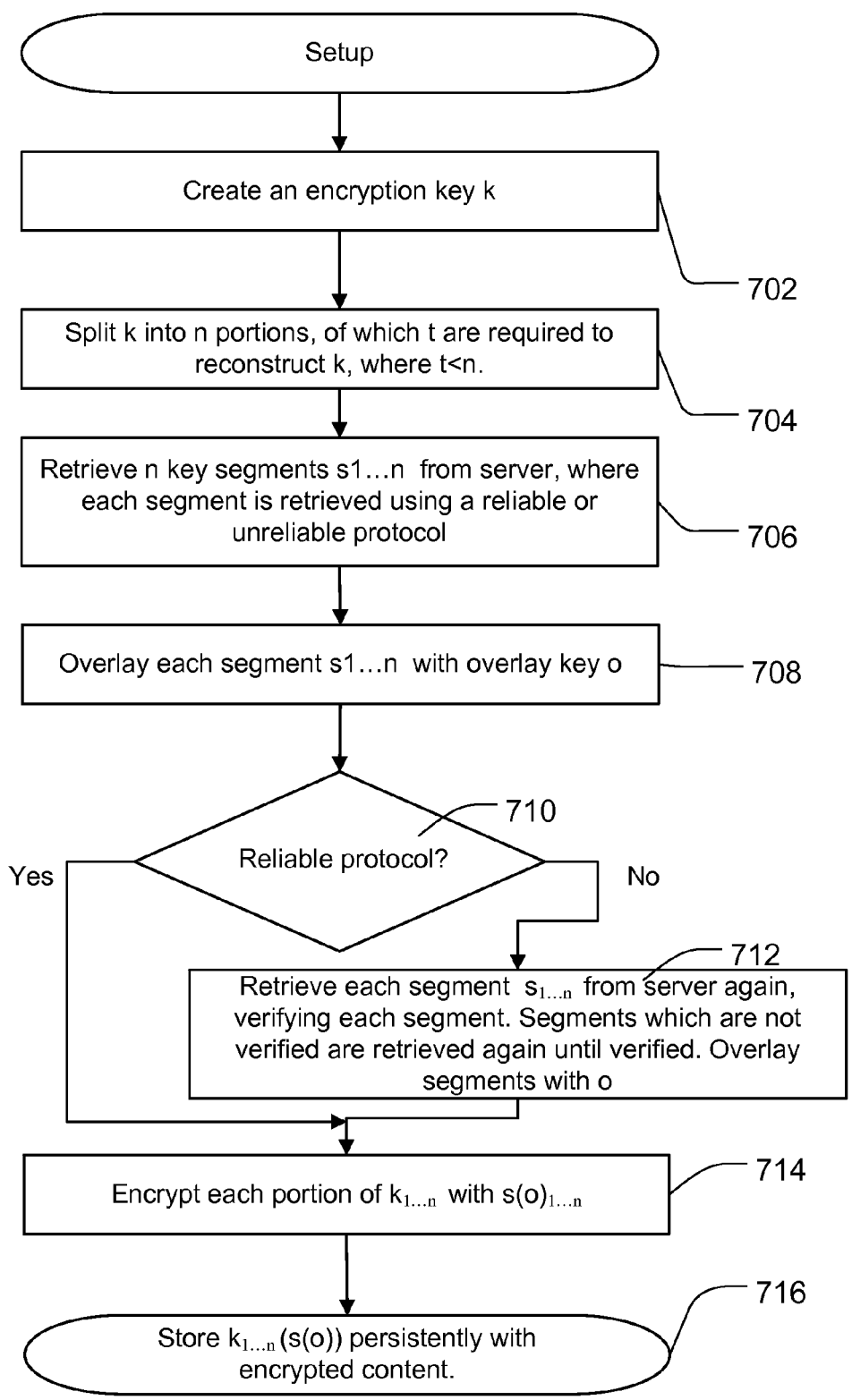
FIG. 7 is a flow diagram illustrating an alternative implementation of the method of FIG. 3 incorporating an overlay key in addition to a key derived from the streamed content.

An example of how the overlay key (or keys) may be integrated into the key generation process of FIG. 3 is illustrated in FIG. 7. The method of FIG. 7 may be executed by the virtual storage device 114 of the client 112 in the host 104 or by the storage device 508 in conjunction with the user agent 518. Upon a request by the user agent to start the process to create an encryption key k (at 702) the initial streamed data with which to create key k is split into end portions of which t are required to reconstruct k, where t<n (at 704). The n key segments $s_{1...n}$ are retrieved from the content server (at 706), where each segment is retrieved using a reliable or unreliable protocol. At this point, the host will overlay each segment s with the overlay key o (at 708). The overlay may be accomplished applying an exclusive or (XOR) function to the overlay key o and each segments s, by applying any of a number of known hash functions to the overlay key and each segment s, or through other known methods. After retrieving the n key segments, the host may determine if the protocol is a reliable protocol (at 710). If a reliable protocol is detected then each portion of encryption key k is encrypted with s(o), the corresponding segment overlayed with the overlay key o, and the encrypted key k(s(o)) is stored with the encrypted streamed content in non-volatile memory the storage device (at 714, 716). As noted above with respect to FIGS. 3-4, the key k is actually broken up into multiple portions $k_{1...n}$ so that each portion of the split key is combined with a respective portion of $s(o)_{1...n}$ to obtain $k(s(o))_{1...n}$. In other embodiments, overlay key o may also be broken up using a secret sharing algorithm where t!=n, but this is not necessary, as t is always equal to n.

If instead of a reliable protocol, an unreliable protocol is detected such as UDP, then each segment $s_{1...n}$ is retrieved from the content server again, to verify each segment and then overlayed with overlay key o. Segments which are not verified are retrieved again until verified (at 712). After verification, the next steps of encrypting each portion of key k with corresponding overlayed segment s(o) and then storing k(s(o)) persistently in the storage device with encrypted streamed content are undertaken (at 714, 716).

Figure 8:
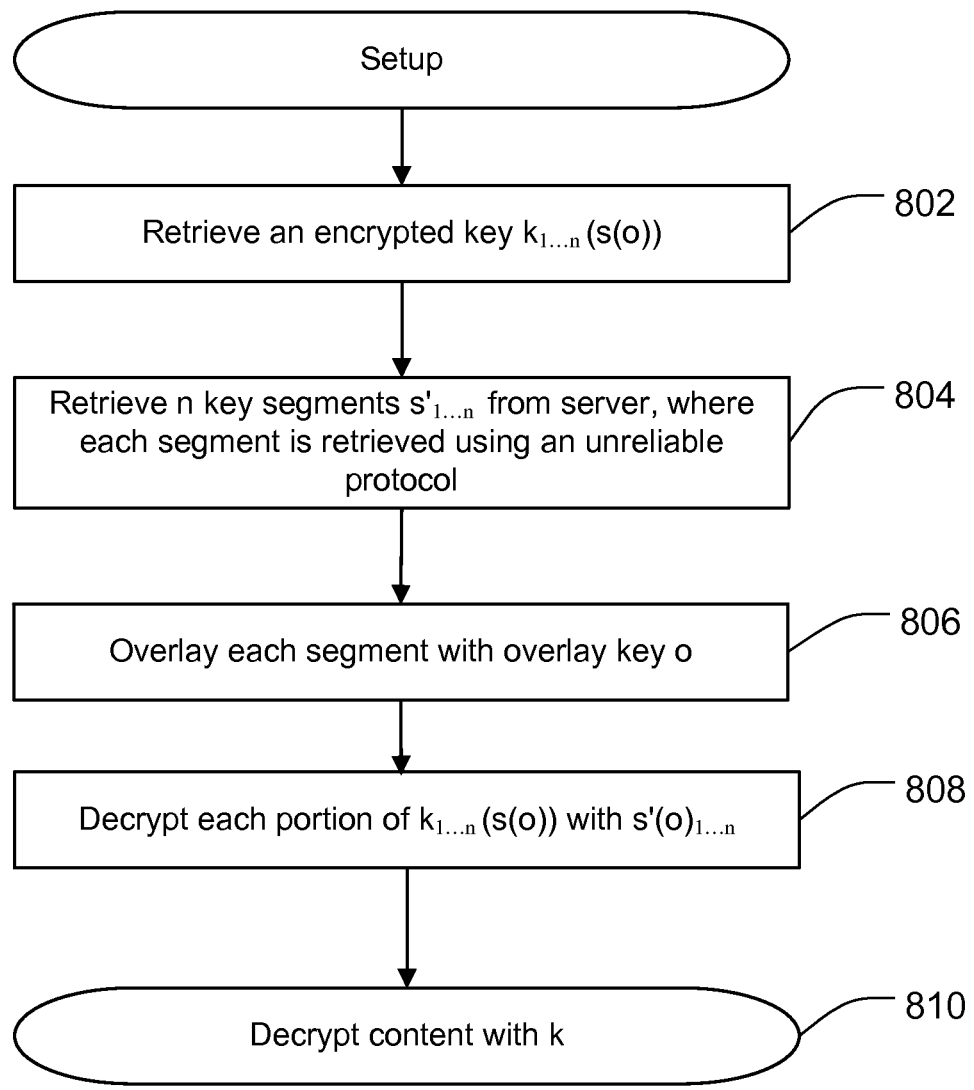
FIG. 8 is a flow diagram illustrating an alternative implementation of the method of FIG. 4.

Similar to the method for regenerating the key discussed in FIG. 4 above, regeneration of the key from encrypted key k(s(o)) is accomplished in the process shown in FIG. 8. First, the host processor retrieves the encrypted key from the storage device. In this case, the encrypted key created by the overlay process in FIG. 7 is k(s(o)). Thus, in response to a request to play back the streamed data that has been cached in the storage device associated with the host, the first step for regenerating the key is to retrieve the encrypted key k(s(o)) (at 802). Next, the n key segments $s'_{1...n}$, where $s'_{1...n}$ represent what could be segments with slight variation in the bits contained therein as compared to the original $s_{1...n}$ due to use of an unreliable protocol, are retrieved from the content server, where each key segment is retrieved using an unreliable protocol (at 804). Each segment $s'_{1...n}$ is overlaid with the overlay key o (at 806) obtained from the SIM card or host hardware. The overlay process for each segment with key o may be accomplished by use of an XOR function, a hash or other technique. After overlaying each segment $s'_{1...n}$ to obtain $s'(o)_{1...n}$, each portion of $k_{1...n}(s(o))$ is decrypted with $s'(o)_{1...n}$ (at 808). The result of this decryption is to obtain unencrypted key k which is then used to decrypt the streamed content in the storage device (at 810).

Alternative methods for implementing the overlay of an overlay key such as a SIM key or host-specific key, is to introduce the overlay key at a different point in the encryption process. Accordingly, the encryption mechanism using an overlay key illustrated in FIG. 7 may be modified to remove the overlay step of step 708 and add in the overlay later in the process. For example, in this alternative overlay embodiment, the overlay which was previously accomplished in step 708 may be accomplished by encrypting each portion of k with s in step 714 rather than encrypting each portion of k with s(o). By encrypting each portion of k with s rather than s(o) the result would be an encrypted key k(s) which may be stored persistently with encrypted content and the overlay of o with k may be done separately in parallel with encryption of k with s such that k(s) and k(o) are maintained separately. The encryption of the received data then would be done by k(o) which would not be saved or stored. Accordingly, in the alternative overlay encryption mechanism to what is currently shown in claim 7, k(s) is stored but the streamed data is stored and encrypted by k(o).

Figure 9:
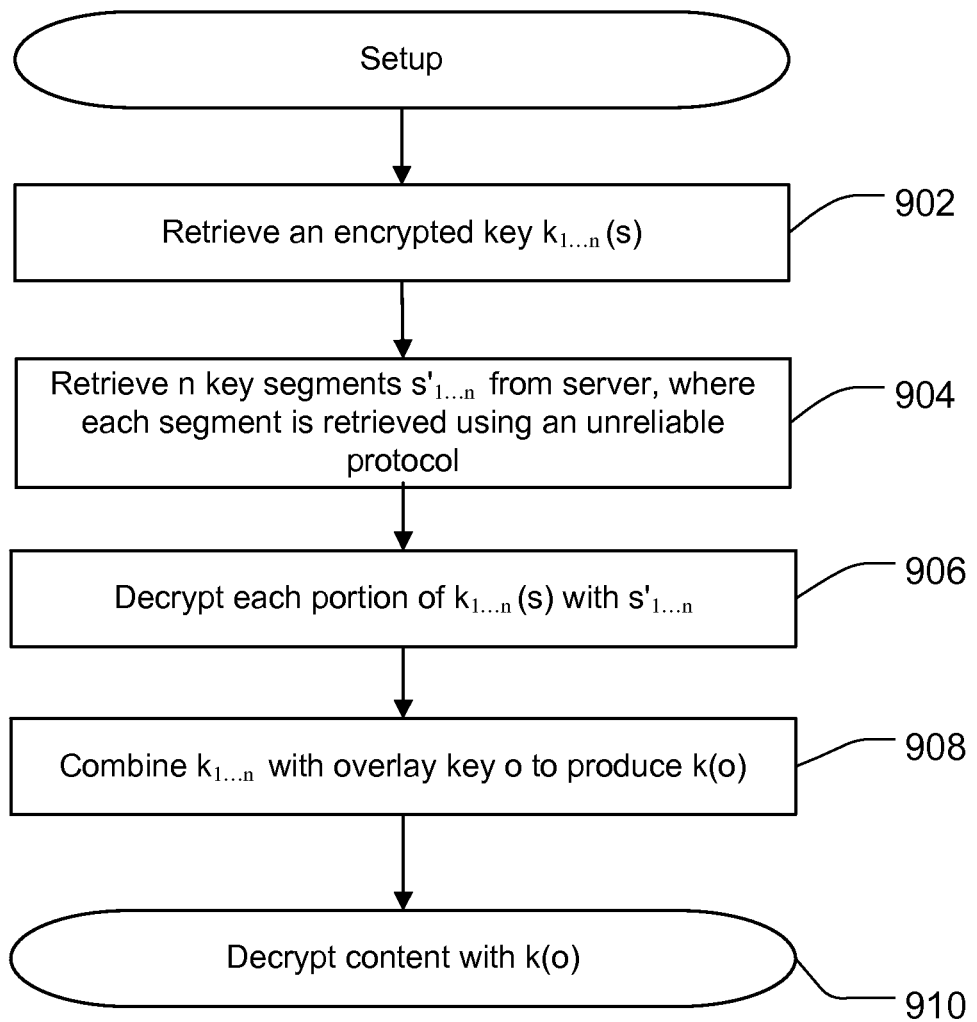
FIG. 9 is a flow diagram illustrating an alternative implementation of the method of FIG. 8.

The regeneration of this alternative version of overlay encryption with an overlay key o is shown in FIG. 9 and differs somewhat from that shown in FIG. 8. The regeneration of key k would first include retrieving the encrypted key k(s) (at step 802) from the storage device and then retrieving the n key segments $s'_{1...n}$ from the content server, where each segment is retrieved using an unreliable protocol, and then overlaying $s'_{1...n}$ with overlay key o to create $s'(o)_{1...n}$ (at step 804). Each portion of $k(s)_{1...n}$ may then be decrypted with $s'(o)_{1...n}$ (at step 906). This would lead to obtaining the unencrypted key k which may then be combined with the overlay key o to produce k(o) (at step 908). Finally, the content encrypted with k(o) in the alternative overlay encryption process discussed above may be decrypted with the now-obtained key k(o) (at 910).

The techniques and devices described above, whether for non-overlay encryption or overlay encryption, may be configured such that the entirety of the encryption and decryption process is handled by the host or by the storage device. In alternative embodiments, responsibility for portions of the process of encryption and decryption of the streamed content may be shared between the host and storage device, however additional care would be necessary regarding handoffs of intermediate encryption and decryption values between the host and storage device in such alternative embodiments.

Any of a variety of mobile device platforms may be used to implement the streamed data protection methods and systems disclosed above. For example a video playback device utilizing a Google Android-based platform is contemplated. In such an implementation, the mobile device may store downloaded content from a video streaming site where streamed content is cached in local storage on a removable storage card and is encrypted using a key derived from streamed content retrieved. As with the embodiments described above, the mobile device (host) would not retain a full, unencrypted key, such that playback is impossible if the content server is not available or is enforcing an access restriction policy.

Methods and systems have been disclosed for permitting a content server to have more control over streamed content that is cached locally to a storage device associated with a host, such as a portable playback device, rather than immediately consumed at the host. The method may include creating an encryption key from a portion of the streamed content itself and encrypting the streamed content with that key as the content is stored to the storage device associated with the host. The method also includes procedures for handling streamed data over unreliable protocols or reliable protocols. Additionally, an overlay key relating to the SIM card and/or host device may be combined with the encryption key derived from a portion of the streamed content to permit further control over content distribution in addition to the control provided to the content server to takedown or enforce access limitations to streamed content. The methods may be implemented on a host device and carried out by a processor on the host device executing applications residing on the host, or on both a storage device configured to manage key generation and encryption in coordination with the host device it is connected to.

What is claimed is:

1. A method for protecting streamed content stored locally on a storage device associated with a host, the method comprising:

in a processor of the host:
requesting content from a content server;
receiving a portion of the content streamed at a predefined bit rate from the content server;
creating an encryption key from the portion of the content streamed at the predefined bit rate;
receiving the content from the content server streamed at a second bit rate different from the predefined bit rate;
encrypting the content streamed at the second bit rate with the encryption key created from the portion of the content streamed at the predefined bit rate; and
storing the encrypted content on the storage device, wherein the encrypted content is cached for playback from the storage device and protected from unauthorized playback.

2. The method of claim 1, wherein the predefined bit rate is lower than the second bit rate.

3. The method of claim 1, wherein the predefined bit rate is higher than the second bit rate.

4. The method of claim 1, wherein creating the encryption key includes determining whether the portion of content streamed at the predefined rate has been streamed using an unreliable protocol and, responsive to determining that the portion of content has been streamed using an unreliable protocol, verifying an accuracy of the portion of content.

5. The method of claim 1, wherein creating the encryption key further comprises:
dividing the encryption key into a plurality of key portions;
retrieving a corresponding plurality of key segments at the pre-defined bit rate;
determining whether the corresponding plurality of retrieved key segments were retrieved using a reliable data protocol or the unreliable data protocol; and
when the processor determines that the plurality of retrieved key segments were sent with an unreliable data protocol, retrieving the corresponding plurality of key segments from the content server again to verify an accuracy of the plurality of key segments.

6. The method of claim 5, further comprising encrypting the encryption key with the corresponding plurality of key segments for storage with the encrypted content on the storage device.

7. The method of claim 6, further comprising discarding an unencrypted version of the encryption key after encrypting the content with the encryption key.

8. The method of claim 7, further comprising:
receiving a request to playback the content stored in the storage device and encrypted with the encryption key;
retrieving the encrypted encryption key from the storage device;
retrieving the plurality key segments from the content server;
decrypting the encrypted encryption key with the plurality of key segments retrieved from the content server;
retrieving from the storage device the content encrypted with the encryption key;
and
decrypting the encrypted content stored using the decrypted encryption key, wherein playback of the content stored on the storage device is dependent upon accessing the portion of the content again from the content server to recreate the encryption key that was used to encrypt the content when it was previously stored.

9. The method of claim 5, further comprising:
applying an overlay key to the plurality of retrieved key segments to create an overlaid plurality of key segments; and
encrypting the encryption key with the overlaid plurality of retrieved key segments, wherein decryption of the encryption key requires access to both the overlay key and the plurality of retrieved key segments.

10. The method of claim 9, wherein applying the overlay key comprises applying an overlay key provided by a network operator.

11. The method of claim 9, wherein applying the overlay key comprises applying a host-specific key to the plurality of retrieved key segments.

12. A host device for protecting streamed content stored locally on a storage device in communication with the host, the host device comprising:
an interface for communicating with a remotely located content server; and
a processor in communication with the interface, the processor configured to:
request content from the content server;
receive a portion of the content streamed at a predefined bit rate from the content server;
create an encryption key from a portion of the content streamed from the content server at the predefined bit rate;
receive the content streamed at a second bit rate different from the pre-defined bit rate;
encrypt the content streamed at the second bit rate with the encryption key created from the portion of the content streamed at the predefined bit rate; and store the encrypted content on the storage device, wherein the encrypted content is cached for playback from the storage device and protected from unauthorized playback.

13. The host device of claim 12, wherein the predefined bit rate is less than the second bit rate.

14. The host device of claim 13, wherein the predefined bit rate is greater than the second bit rate.

15. The host device of claim 12, wherein to create the encryption key the processor is further configured to:
   divide the encryption key into a plurality of portions;
   retrieve a corresponding plurality of key segments at the predefined bit rate;
   determine whether the corresponding plurality of retrieved key segments were sent with a reliable data protocol or an unreliable data protocol; and
   when the processor determines that the corresponding plurality of retrieved key segments were sent with an unreliable data protocol, retrieve the corresponding plurality of key segments from the content server again to verify an accuracy of the plurality of key segments.

16. The host device of claim 15, wherein the processor is further configured to encrypt the encryption key with the corresponding plurality of key segments for storage with the content on the storage device.

17. The host device of claim 16, further comprising discarding an unencrypted version of the encryption key after encrypting the content with the encryption key.

18. The host device of claim 17, wherein the processor is further configured to:
   receive a request to playback the content stored in the storage device and encrypted with the encryption key;
   retrieve the encrypted encryption key from the storage device;
   retrieve the plurality of key segments from the content server using an unreliable protocol;
   decrypt the encrypted encryption key with the plurality of key segments retrieved from the content server;
   retrieve from the storage device the content encrypted with the encryption key; and
   decrypt the encrypted content retrieved from the storage device using the decrypted encryption key, wherein playback of the content stored on the storage device is dependent upon accessing the portion of the content again from the content server to recreate the encryption key that was used to encrypt the content when it was previously stored.

19. The host device of claim 15, wherein the processor is further configured to:
   apply an overlay key to the plurality of retrieved key segments to create an overlaid plurality of key segments; and
   encrypting the encryption key with the overlaid plurality of key segments, wherein decryption of the encryption key requires access to both the overlay key and the plurality of retrieved key segments.

20. The host device of claim 19, wherein the overlay key comprises an overlay key provided by a network operator.

21. The host device of claim 19, wherein the overlay key comprises applying a host-specific key to the plurality of retrieved key segments.

22. The host device of claim 21, wherein the host-specific key is based on at least one of a host serial number, chipset information for the host and international mobile equipment identity (IMEI) information.

23. A method for protecting streamed content stored locally on a storage device associated with a host, the method comprising:
   in a processor of the host:
   receiving a request to playback content stored on the storage device, wherein the content stored on the storage device was previously downloaded at a second bit rate and has been encrypted with an encryption key comprising a portion of the content previously downloaded at a predefined bit rate different than the second bit rate;
   retrieving an encrypted version of the encryption key from the storage device;
   receiving a plurality of key segments from a content server streamed at the predefined bit rate;
   decrypting the encrypted encryption key with the plurality of key segments streamed from the content server at the predefined bit rate;
   reconstituting the encryption key with a secret sharing algorithm;
   retrieving from the storage device the content encrypted with the encryption key; and
   decrypting the content stored on the storage device using the decrypted and reconstituted encryption key.

24. The method of claim 23, wherein the predefined bit rate is less than the second bit rate.

25. The method of claim 23, wherein the predefined bit rate is greater than the second bit rate.

* * * * *